United States Patent [19]

Sangu

[11] Patent Number: 4,688,109
[45] Date of Patent: Aug. 18, 1987

[54] HELICAL SCAN TRACKING APPARATUS INCLUDING MEANS FOR CORRECTING FOR TRACK CURVATURE

[75] Inventor: Isao Sangu, Tokyo, Japan
[73] Assignee: NEC Corporation, Japan
[21] Appl. No.: 596,710
[22] Filed: Apr. 4, 1984
[30] Foreign Application Priority Data
   Apr. 4, 1983 [JP] Japan .................. 58-58884
[51] Int. Cl.[4] .................. G11B 5/58; G11B 21/10; H04N 5/783
[52] U.S. Cl. .................. 360/10.2; 360/70; 360/77
[58] Field of Search .................. 360/10.2, 10.3, 77, 360/70, DIG. 1

[56] References Cited

U.S. PATENT DOCUMENTS

| | | | |
|---|---|---|---|
| 3,881,184 | 4/1975 | Koepcke et al. | 369/32 |
| 4,151,570 | 4/1979 | Ravizza et al. | 360/77 |
| 4,438,463 | 3/1984 | Sakamoto | 360/10.2 |
| 4,443,823 | 4/1984 | Sakamoto | 360/77 |
| 4,520,410 | 5/1985 | Sekiguchi et al. | 360/10.2 |

Primary Examiner—Raymond F. Cardillo
Assistant Examiner—Hoa T. Nguyen
Attorney, Agent, or Firm—Ostrolenk, Faber, Gerb & Soffen

[57] ABSTRACT

A scan tracking circuit for helical scan video tape recorders. The circuit creates and combines three control signals and generates as an output a deflection signal which serves to accurately maintain the scanning head on a desired track. The first control signal is sawtooth shaped and is based upon and derived from the speed of the tape. The second control signal is dependent on the signal which is developed by the scanning head and is also correlated with other signals which are obtained from previous scans of a previous scanned video track. The third signal is selected from a plurality of stored signals each of which is tailored to correct for a characteristic curvature pattern associated with video tracks produced by a particular VTR machine. The final deflection signal is a composite of the three control signals.

9 Claims, 10 Drawing Figures

| TRACK NO. | AVERAGE REPRODUCED SIGNAL MAGNITUDE | | | HEAD DEFLECTION DIRECTION | | |
|---|---|---|---|---|---|---|
| N-2 | $B_{21}$ | $B_{22}$ | $B_{23}$ | $D_{21}$ | $D_{22}$ | $D_{23}$ |
| N-1 | $B_{11}$ | $B_{12}$ | $B_{13}$ | $D_{11}$ | $D_{12}$ | $D_{13}$ |
| N | $B_{01}$ | $B_{02}$ | $B_{03}$ | $D_{01}$ | $D_{02}$ | $D_{03}$ |

ONE TRACK

HELICAL SCAN TRACKING APPARATUS INCLUDING MEANS FOR CORRECTING FOR TRACK CURVATURE

BACKGROUND OF THE INVENTION

The present invention relates to a video tape recorder (VTR) of the helical scan type, and particularly to a scan tracking apparatus for a video reproducing head to be employed when a still, slow-motion or quick-motion image is reproduced by the VTR of this kind.

When a specific reproduction such as a still, slow-motion or quick-motion reproduction is performed by a helical scan VTR, the video reproducing head is deflected with a sawtooth waveform to track a video track on a magnetic tape. In this case, it is necessary that the video reproducing head should be controlled to track the center of the video track. Such a technique for tracking the video track is disclosed in the U.S. Pat. No. 4,151,570, whose contents are herein incorporated for reference.

As disclosed in detail in U.S. Pat. No. 4,151,570, a typical helical scan tracking apparatus includes the features which are shown in FIGS. 7, 8, 9 and 10 of the drawings herein. FIG. 7 shows a cylindrical drum 50 with a peripheral side wall 52. The cylindrical drum is rotatable about a central axis 54. A magnetic tape reading head 56 is mounted within the cylindrical drum 50, and it is positioned to be flush with the peripheral side wall 52 of the cylindrical drum. The head 56 is supported on a transducer positional element 58, the positional element in turn being controlled to allow the head 56 to move up and down along a path which is essentially parallel to the rotational axis 54 of the cylindrical drum 50. The cylindrical drum 50 is shown in FIG. 8, with a tape 60 helically wound around it in such a way that the head 56 which is deflectably mounted on the cylindrical drum 50 is capable of tracking video tracks which are recorded on the tape 60. The information is recorded diagonally on the tape 60 as shown in FIG. 10, and due to the helical path that the tape 60 defines along the peripheral side wall 52 of the cylindrical drum 50, and further in view of the fact that the head 56 is allowed to deflect in the longitudinal direction, the head 56 is capable of tracking each discrete recorded video track 66. FIG. 9 shows the head 56 which is mounted on the positional transducer 58 which allows the head to be moveable along the direction shown by arrow 64. The disclosed technique employs a feed back servo system, in which the video reproducing head is vibrated by an output of a dither oscillator, a frequency modulated RF signal derived from the head is subjected to envelope detection, the resultant output is further subjected to synchronous detection with the output of the dither oscillator, and the synchronous detected output is fed back to the video reproducing head through a head drive amplifier. However, this technique requires the dither oscillator and the servo system which means that the construction of the apparatus is complicated, and a complicated operation is required to control the servo system.

In order to eliminate these shortcomings, Sekiguchi et al. proposed a technique on Feb. 28, 1983, in the U.S. Pat. No. 470,667, now U.S. Pat. No. 4,520,410, the disclosures of which are incorporated herein by reference in which a correlation between reproduction outputs extracted from adjacent video tracks is utilized for tracking the video track. In the proposed technique, the reproduction output level from a given video track is compared with a stored level extracted from the preceding video track, and the video head is deflected by a very small amount in a direction corresponding to the result of the comparison.

It is known that, in practice, a video track recorded on the magnetic tape is bent within a certain scope. The bend of the video track is particularly large at edge portions in the video track. The shape and rate of the bend of the video track are fairly similar in VTRs made by the same manufacturer, and therefore accurate tracking can be performed in these recorders using the prior art technique. However, the linearity of the video track, i.e., the shape and rate of the bend at the edge portions in the video track vary between VTRs manufactured by different manufacturers, respectively, and thus accurate tracking is not achieved when a tape recorded by a VTR of one manufacturer is played on a VTR of another manufacturer. In the worst case, this results in the appearance of noise in the reproduced picture.

SUMMARY OF THE INVENTION

It is therefore an object of the present invention to provide a scan tracking apparatus for a helical scan video tape recorder which provides compensation for tracking errors caused by a bend of the video track.

According to the present invention, there is provided a scan tracking apparatus for a helical scan video tape recorder which comprises means for generating a first control signal of a sawtooth waveform which has a slope corresponding to a tape running speed, means for detecting and storing an amplitude of an RF signal reproduced from a video track, means for comparing the detected amplitudes corresponding to two adjacent video tracks, means for generating a second control signal which deflects a video reproducing head by a predetermined small width in accordance with the result obtained from the comparison means, and means for generating a third control signal to compensate for a tracking error due to bends in the video track which change the slope of a track at end portions. The video reproducing head is deflected responsive to the first, second and third control signals.

DESCRIPTION OF PREFERRED EMBODIMENTS

Figure 1:
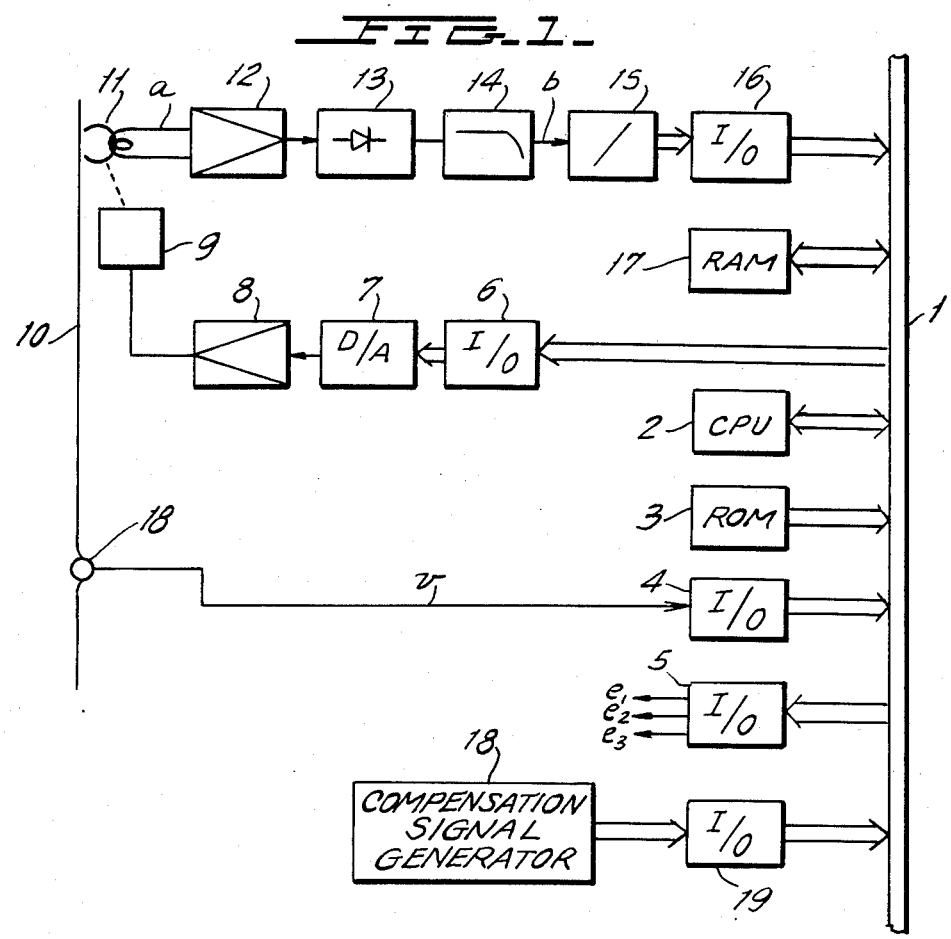
FIG. 1 shows an embodiment of the present invention.

FIG. 1 shows one embodiment of the present invention, in particular a control section which performs a scan tracking operation. In the control section, a bus line 1 interconnects a CPU 2 which is used for overall process and control, a read-only memory (ROM) 3 which stores a control program, an interface (I/O) 4 which receives a speed signal v from a tape speed detection means such as a timer roller 18, and an interface (I/O) 5 which outputs a one-track jump signal $l_1$, a two-track jump signal $l_2$ or a skip jump signal $l_3$ corresponding to a deflection width of a video reproducing head. A signal C for controlling the deflection of the video reproducing head 11 is sent from the bus line 1 to a reproducing head driving member 9 which includes a piezoelectric element, via an I/O 6, a D/A converter 7 and an amplifier 8 so as to deflect the video reproducing head perpendicularly to the video track arranged on a magnetic tape 10. A frequency-modulated (RF) signal output a from the video reproducing head 11 is amplified by an amplifier 12 and rectified by a detector 13. The resultant signal from the detector 13 is delivered as an envelope signal of the reproduced RF signal a (the envelope signal b will be referred to as the reproduced signal. The reproduced signal b is passed through a low-pass filter 14, to remove unnecessary high-frequency components therefrom. It then converted into a digital signal by an analog-to-digital (A/D) converter 15. This digital signal delivered from the A/D converter 15 is supplied to the bus line 1 through an I/O 16.

In the A/D converter 15, the reproduced signal b is sampled with a sampling frequency of 15750 Hz which is synchronous with a horizontal sync signal, and is converted into 8-bit parallel data. Although the reproduced RF signal from the video reproducing head is a frequency-modulated signal, the amplitude of the RF signal varies according to the video signal level. Therefore, the sampling is applied at the timing corresponding to the sync signal, which has constant magnitude.

The data from the A/D converter 15 is output to the bus 1 through the I/O port 16. During this time, the data from the A/D converter is not transferred to the bus line 1 synchronously with the sample timing, but is taken thirty-four times for each field. A reproducing head deflection control signal C is reproduced on the basis of the data supplied to the bus line 1.

Figure 2:
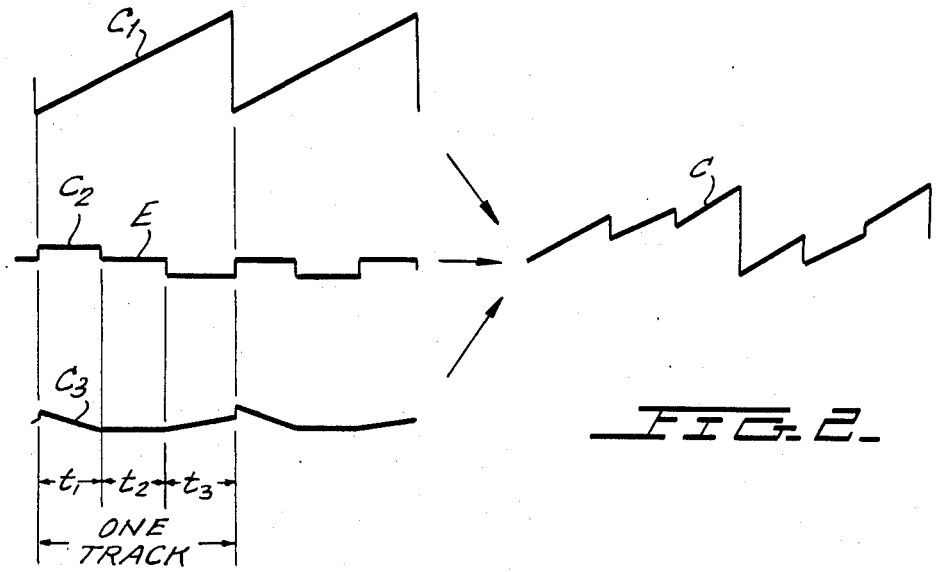
FIG. 2 is a timing diagram showing the control signals produced by the circuits of FIG. 1 for deflecting a video reproducing head.
Figures 3, 4:
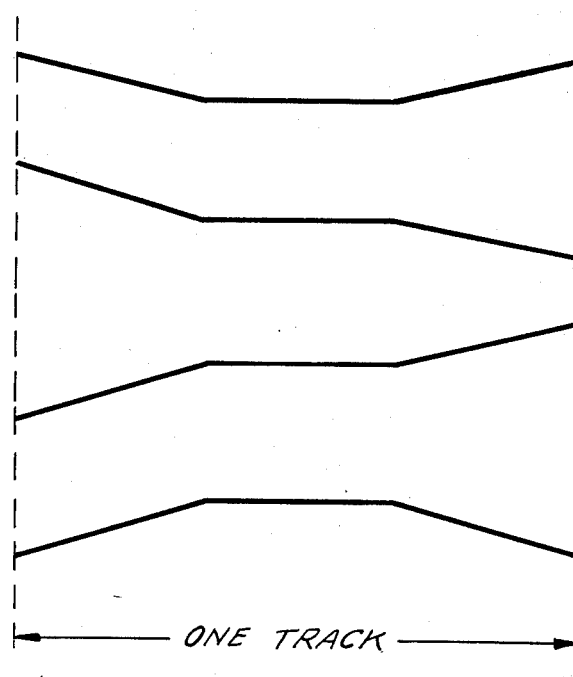
FIG. 3 is a table for explaining a formating process of a second control signal $C_2$ of FIG. 2.
FIG. 4 shows different wave forms for a third control signal $C_3$ obtained according to the present invention.

Next, the reproducing head deflection control signal C will be described with reference to FIG. 2. As shown in this figure, the control signal C is composed of a sawtooth wave $C_1$ which is generated according to the tape speed and deflects the video reproducing head, a stair-like follow-up control signal $C_2$ which is determined on the basis of the increase or the decrease of the RF signal level in comparison with that of the track scanned previously and which deflects the video reproducing head by a very small width (predetermined width), and a control signal $C_3$ which compensates for the bend of the video track according to the present invention. A description of the sawtooth wave $C_1$ will be omitted, since it is well-known. The follow-up control signal $C_2$ deflects the reproducing head upward or downward by the predetermined width in the direction perpendicular to the video track. In the present embodiment, one track (one field) is divided into three segments $t_1$, $t_2$ and $t_3$, as shown in FIG. 2, and the control signal $C_2$ is produced in each segment by utilizing a correlation between the adjacent video tracks. This will now be described with reference to the table of FIG. 3. If it is assumed that video tracks (N-2), (N-1) and N are scanned by the reproducing head sequentially and that an average reproduction level B (the method of determining this level B will be described later in detail) is measured then the deflection levels D are obtained as shown in the table of FIG. 3. Furthermore, the corresponding direction D in which the head is controlled upward or downward is also assumed as shown in the table. While the track (N-1) is scanned by the reproducing head, the average reproduction levels $B_{21}$, $B_{22}$ and $B_{23}$ obtained during scanning the preceding track (N-2) are each stored in a memory (RAM) 17.

On the other hand, when the preceding video track N-2 is scanned, the deflection directions $D_{11}$, $D_{12}$ and $D_{13}$ corresponding to the video track N-1 are determined by comparing the average reproduced signals of the video track N-2 with that of a previous video track N-3, and already stored in a memory (not shown). During the scanning of the track N-1, for the scanning of the video track N, the average reproduced signal magnitude $B_{21}$ corresponding to the video track N-2 and the average magnitude $B_{11}$ corresponding to the video track N-1 are compared in the first segment $t_1$. When $B_{11} \geq B_{21}$, the deflection direction $D_{01}$ for the first segment of the next track N is determined to conform to the deflection direction $D_{11}$ set for the scanning of the track N-1. Conversely, when $B_{11} < B_{21}$, the deflection direction $D_{01}$ is set in the direction opposite to the direction $D_{11}$. In the second segment $t_2$, the magnitudes $B_{22}$ and $B_{12}$ are compared. When $B_{12} \geq B_{22}$, the direction $D_{02}$ is set to conform to the direction $D_{12}$. When $B_{12} < B_{22}$, the direction $D_{02}$ is set in the direction opposite to the direction $D_{12}$. In the third segment $t_3$, the direction $D_{03}$ is set to conform to the direction $D_{13}$ when $B_{13} \geq B_{23}$, and in the direction opposite to the direction $D_{13}$ when $B_{13} < B_{23}$. In this embodiment, one shift level E of the follow-up control signal $C_2$ is set to be 1/16 of a level which makes the video reproducing head jump by one track. The level E is also a level capable of varying the magnitude of the reproduced RF signal by 0.5–1.0 dB. In the initial stage of the operation of a VTR, the average reproduced signal magnitude can not be obtained from a previously-scanned track. Therefore, a signal deflecting the video reproducing head in a certain direction is produced as the follow-up control signal $c_2$ by subjecting the level E to addition or subtraction.

Assuming the levels of the control signal $C_2$ corresponding to the segments $t_1$, $t_2$ and $t_3$ to be levels $M_{11}$, $M_{12}$ and $M_{13}$ in the track N-1, and to be levels $M_{01}$, $M_{02}$ and $M_{03}$ in the track N (this time), respectively, when the reproducing head deflection direction $D_0$ is "1" indicating that the reproducing head is to be deflected upward, the control signal level is produced by the computation $M_{01} = M_{11} + E$. When the reproducing head deflection direction $D_0$ is "0" indicating that the reproducing head is to be deflected downward, the control signal level is produced by the computation $M_{01} = M_{11} - E$. The levels $M_{02}$ and $M_{03}$ of the segments $t_2$ and $t_3$ are also produced in the same manner, i.e., by the computations $M_{02}=M_{12}\pm E$ and $M_{03}=M_{13}\pm E$. The method of generating this control signal $C_2$ is exactly the same as that disclosed in U.S. Pat. Ser. No. 470,667 mentioned above. In FIG. 1, the control signal $C_3$ according to the invention is generated by a bend compensation signal generator 18 and supplied through an I/O 19 to the bus line 1.

Figure 5:
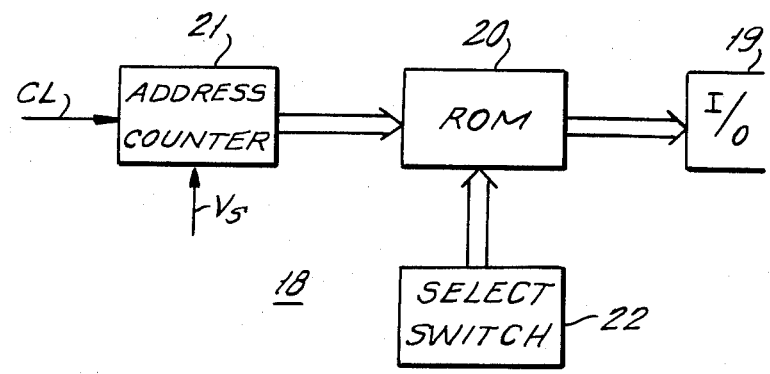
FIG. 5 is a block diagram for a circuit for generating the third control signal $C_3$ for compensating bends of a video track.
Figure 6:
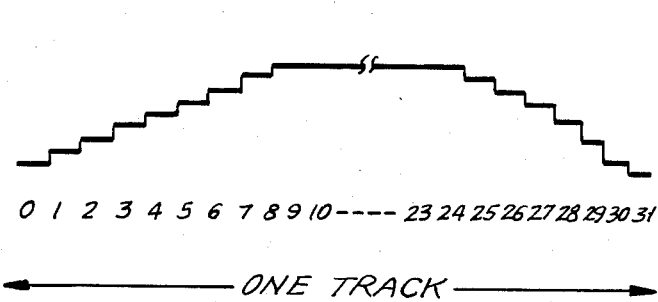
FIG. 6 shows one example of data representing the third control signal $C_3$.
Figure 7:
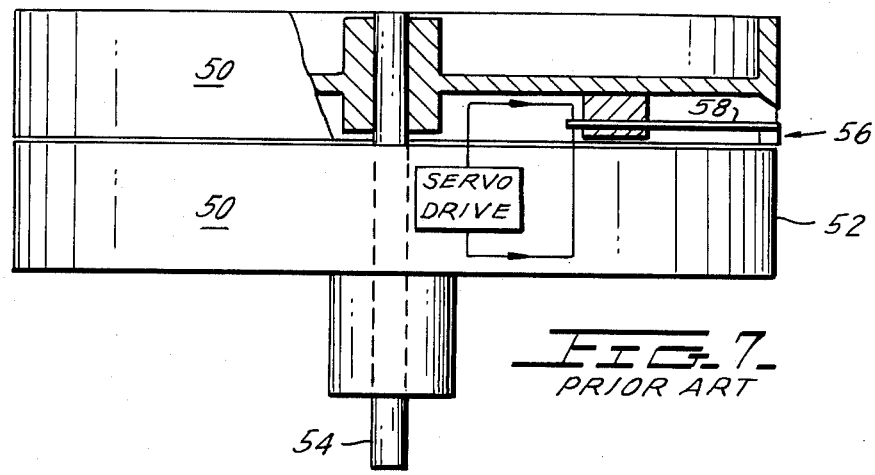
FIG. 7 shows a cylindrical drum with a peripheral wall and a head which is mounted within the cylindrical drum and flush with the peripheral wall of the cylindrical drum (prior art)
Figure 8:
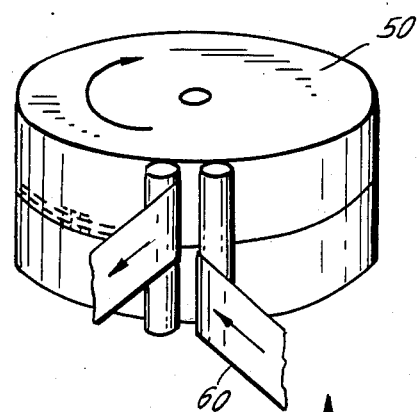
FIG. 8 shows the cylindrical drum around which a recorded magnetic tape is wound in a helical fashion (prior art)
Figure 9:
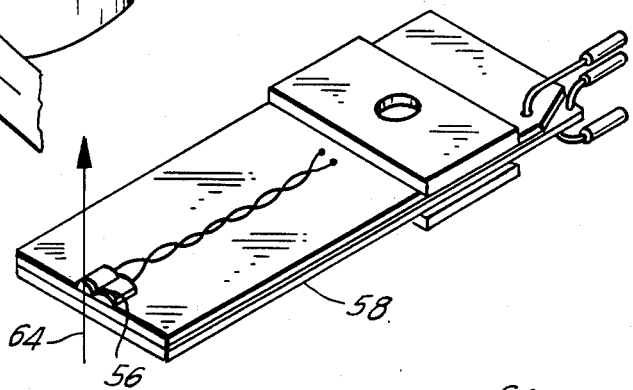
FIG. 9 shows a transducer positional element which is mounted within the cylindrical drum and which supports the head and allows it to be deflected laterally through the video tracks recorded on a magnetic tape (prior art)
Figure 10:
FIG. 10 shows a magnetic tape medium on which discrete diagonal video tracks are recorded.

The control signal $C_3$ compensating the bend of the video track according to the present invention will now be described. As described previously, the bend of the video track is most prominent at the edge portions thereof. Consequently, the control signal $C_3$ compensating for such bend is considered to have four basic waveforms as shown in FIG. 4. It is obvious that the slope of these waveforms can vary, and that the slope thereof may be formed by a curve instead of the straight line shown in FIG. 4. Referring to FIG. 5 showing the bend compensation signal generator 18 (FIG. 1), the control signal $C_3$ is stored as discrete data in a read-only memory (ROM) 20, and an address for reading out the ROM is prepared in an address counter 21. The address counter 21 produces the address by counting a clock CL and is reset by a vertical sync signal $V_S$. The period of the vertical sync signal $V_S$ matches the period of one video track. When the control signal $C_3$ is determined at thirty-two points during the time needed to cover one video track, the frequency of the clock CL is selected to be thirty-two times the vertical sync frequency. In the ROM 20, many kinds of the control signals $C_3$, each having a different shape and slope, are stored as required, and one of them is selected by a selection switch 22. In practice, the selection of the selection switch 22 is performed in a manner that a color-bar signal or the like previously recorded on the magnetic tape is reproduced. A control signal $C_3$ with the minimum noise is selected. FIG. 6 shows one example of data representing the control signal $C_3$ read out from the ROM 20. In this embodiment, the segmentation of one video track is the same as that for producing the control signal $C_2$. The control signal $C_3$, therefore has three segments as shown in FIG. 2. However, it is obviously possible to apply different segmentations. Furthermore, the present invention can be, of course, applied to the tracking technique disclosed in U.S. Pat. No. 4,151,570.

As described above, the present invention makes it possible to accurately compensate the bend of the video track, especially in the edge portions thereof which can not be compensated by conventional tracking techniques, and thus is very effective.

What is claimed is:

1. A scan tracking apparatus for a helical scan video tape recorder, comprising:

head means for sequentially scanning a plurality of video tracks formed on a magnetic tape to produce a reproduced video signal representative of information contained in said video tracks, said video tracks having a curvature characteristic, said head means including a signal reproducing head and means for deflecting said head transversely to said video tracks in response to a deflection signal applied thereto;

means for producing a first control signal having a sawtooth shape, said first control signal varying as a function of tape speed;

means responsive to said reproduced video signal for producing a second control signal by correlating reproduced video signals obtained from previously scanned video tracks;

means for storing a plurality of different curvature correction signals, said curvature correction signals each corresponding to a respective possible video track curvature characteristic;

means for selecting and retrieving one of said stored curvature correction signals, said selected signal corresponding to said curvature characteristic of said video tracks;

means responsive to said selected signal for producing a third control signal; and means for generating said deflection signal as a function of said first, second and third control signals.

2. A scan tracking apparatus for a helical scan video tape recorder comprising:

head means for scanning a video track on a magnetic tape to produce a reproduced signal representative of information contained in said video track, said head means including a signal reproducing head and means for receiving a deflection signal and in response thereto deflecting said head transversely to said video track, and said track having a curvature characteristic;

means responsive to a tape speed for producing a first control signal having a sawtooth shape, said sawtooth shape varying as a function of said tape speed;

means responsive to said reproduced signal for producing a second control signal, said second control signal being for deflecting said head means by a predetermined width to track the center of said video track;

memory means for storing a plurality of data segments, each corresponding to a different one of a plurality of possible curvature characteristics for said video track;

address generating means for generating a reading address for said memory means;

selecting means for delivering a selection signal to select a desired data segment from among said plurality of data segments;

reading means responsive to said reading address and said selection signal for reading said desired data segment from said memory means to produce a third control signal; and means responsive to said first, second and third control signals for producing said deflection signal for deflecting said head means.

3. The apparatus as in claim 1 wherein said means for generating said deflection signal as a function of said first, second and third control signals comprise:

a CPU device for receiving said first, second and third control signals and for generating in response thereto an intermediate digital deflection signal;

a digital-to-analog device; and an amplifier, said digital-to-analog device receiving said intermediate digital deflection signal and generating, in conjunction with said amplifier, said deflection signal.

4. The apparatus of claim 1, wherein said head means comprise:

a video reproducing head for obtaining a frequency modulated output signal from said tape;

an amplifier for amplifying said frequency modulated output signal;

a detector for rectifying said amplified frequency modulated output signal;

a low pass filter for removing undesirable high-frequency components from said rectified output signal to generate a filtered signal; and an analog-to-digital converter for converting said filtered signal into a digital signal, and wherein said means responsive to said reproduced video signals comprise a CPU device, said CPU device receiving said digital signal and developing therefrom said second control signal.

5. The apparatus according to claim 4, wherein said analog-to-digital converter samples said filtered signal at a sampling frequency which is synchronous with a horizontal sync signal of said apparatus.

6. The analog-to-digital converter as in claim 5, wherein said sampling frequency operates at the rate of 15,750 Hz and wherein said digital signal comprises eight bit parallel data words.

7. The apparatus of claim 1, wherein said means for storing a plurality of curvature correction signals comprises a read only memory for storing therein a plurality of data segments, each corresponding to a different one of said plurality of different curvature characteristics;

an address generator for generating a reading address for said read only memory;

a select switch for generating a selection signal for selecting a desired data segment from among said plurality of data segments;

reading means responsive to said reading address and said selection signal for reading said desired data segment from said read only memory; and a CPU device for receiving said desired data read out from said read only memory and for generating said third control signal in response thereto.

8. A helical scan tracking apparatus, comprising:

head means mounted on a rotatable, cylindrical drum past which video tracks recorded on magnetic tape are passed, said head being mounted to be deflectable laterally to said recorded tracks; and circuit means for controllably deflecting said head laterally to said recorder tracks to ensure that said head follows the center of said recorded video tracks, said circuit means responding in part to a curvature correction signal applied thereto which indicates to said circuit means a curvature shape associated with said video tracks, said signal being operative to guide said head along curving portions of each of said discrete tracks;

memory means for storing a plurality of different curvature correction signals;

reading means for retrieving a selected one of said plurality of said different curvature correction signals and applying said selected correction signal to said circuit means; and human operated selection means for enabling a human operator to determine which of said curvature correction signals is to be retrieved by said reading means to find a curvature correction signal that produces improved images from said recorded video tracks.

9. A method for allowing a helical scan VTR head of a video tape recorder to closely follow curved sections of discrete video tracks which may have been recorded by means of variously manufactured VTR units on a magnetic tape, said VTR including a deflection mechanism which allows said head to be deflected substantially perpendicularly to said tracks, said method comprising the steps of:

continuously reading a selected signal from a memory containing a plurality of correction signals, each said correction signal being tailored for a uniquely defined curvature pattern;

continuously applying said selected signal to said deflection circuit to finely control the position of said head relative to said track;

entering through human interactive control an address for said memory to allow another of said plurality of signals to be read from said memory; and repeating said entering step until a correction signal is found which produces desired video images from said recorded video tracks.

* * * * *